United States Patent
Krysiak et al.

(10) Patent No.: US 6,746,707 B2
(45) Date of Patent: Jun. 8, 2004

(54) LAMINATED MULTI-LAYERED CEREAL PRODUCTS AND METHODS OF PREPARATION

(75) Inventors: Dawn L. M. Krysiak, Minneapolis, MN (US); Patrick E. Allen, Monticello, MN (US); Terry T. Kirihara, Bloomington, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 10/042,835

(22) Filed: Jan. 8, 2002

(65) Prior Publication Data

US 2003/0134010 A1 Jul. 17, 2003

(51) Int. Cl.$^7$ ............................................. A23L 1/164
(52) U.S. Cl. ........................ 426/620; 426/94; 426/249; 426/618; 426/619
(58) Field of Search .................. 426/94, 249, 618, 426/619, 620

(56) References Cited

U.S. PATENT DOCUMENTS

| 4,696,825 | A | * | 9/1987 | Leibfred | 426/283 |
|---|---|---|---|---|---|
| 4,940,593 | A | * | 7/1990 | Duffy | 426/94 |
| 5,558,890 | A | * | 9/1996 | Brown et al. | 426/94 |
| 5,770,248 | A | * | 6/1998 | Leibfred et al. | 426/93 |
| 6,048,555 | A | * | 4/2000 | Kamper et al. | 426/89 |

* cited by examiner

*Primary Examiner*—Lien Tran
(74) *Attorney, Agent, or Firm*—John A. O'Toole; Everett G. Diederiks, Jr.; Douglas J. Taylor

(57) ABSTRACT

Disclosed are dried laminated multi-layered cereal pieces, especially R-T-E breakfast products, and methods of preparation. In particular, the cereal pieces are characterized by a highly laminated structure comprising a multiplicity of generally horizontal thin parallel layers numbering at least four to 20 each of—100–500 micrometers ("$\mu$m") thickness fabricated from cooked cereal dough with interstitial voids between the layers. The pieces can vary in shape and range from bite-sized to biscuit-sized. The interstitial void spaces between layers average 0.8 millimeters. This laminated structure creates cereal pieces having a distinctive texture and appearance. Methods for fabricating the present laminated multi-layered cereal pieces comprise: A) forming thin layers of cooked cereal dough(s) as sheets or flakes; B) compressing the thin cereal dough layers to form a laminated layered mass; C) forming individual pieces from the laminated mass; D) drying/toasting the individual pieces to 2% to 6% finished moisture; and, optionally E) applying one or more topical coatings to form finished cereals products with multiple layers.

47 Claims, 2 Drawing Sheets

20mm

20mm

LAMINATED MULTI-LAYERED CEREAL PRODUCTS AND METHODS OF PREPARATION

BACKGROUND OF THE INVENTION

The present invention relates to food products and to their methods of preparation. In particular, the present invention relates to cereal products especially ready-to-eat cereals and/or cooked grain based snacks composed of thin laminated layers with interstitial voids that create a pastry-like texture, and to their methods of preparation.

Ready-to-eat ("R-T-E") cereals, often called breakfast cereals, are popular food items. Such food products are dried food products generally prepared from pieces fabricated from cooked cereal doughs. Snack food products prepared from cooked cereal doughs can be similar although are generally pieces of larger size often dried by deep fat frying, e.g., corn chips.

R-T-E cereals have been prepared in a wide variety of shapes, sizes, compositions, textures, flavors and the like. Efforts continue in the art to develop R-T-E cereals having new shapes or structures, textures or eating sensations and visual appeal or appearance.

The present invention is directed towards R-T-E cereals and grain based snack products of novel structure, eating sensation, and appearance as well as to practical methods for their large scale or commercial manufacture. In particular, the present invention is directed towards R-T-E cereal pieces characterized by a highly laminated structure comprising a multiplicity of generally horizontally aligned thin parallel layers with interstitial voids.

R-T-E cereals of more than one layer are known. Products comprising two or three layers are particularly well known. However, products having more than three layers are less well known due to manufacturing difficulties in fabrication and drying of the intermediate layers. For these and other reasons, such products are generally fabricated from multiple layers of open nets or weaves. In particular, biscuits comprising multiple layers of webs or filaments are popular cereals. Often such products include an intermediate fruit paste layer and/or a topical sugar coating layer often on one or both major faces.

Biscuits of compressed flakes from individual cooked grain berries are also known, with the flakes randomly compressed into a molded biscuit. However, the flakes are randomly oriented not generally horizontally aligned. Also, the flakes are much smaller averaging less than 40 mm². Such biscuits can include added particulates such as fruit and nuts compressed with the flakes, and can be topically coated.

Multicolored two-ply R-T-E cereals are also known (see, for example, U.S. Pat. No. 4,940,593, issued Jul. 10, 1990 to D. K. Duffy entitled "Multicolored R-T-E Cereal and Method of Preparation") that rely upon using a highly puffable cereal dough such as rice flour. Puffed three ply cereals are also known (see for example, U.S. Pat. No. 5,558,890 entitled "Multi-layered Puffed R-T-E Cereal and High Intensity Microwave method of Production" issued Sep. 24, 1996 to Brown et al. which is incorporated herein by reference). The products and methods of preparation in the '890 patent relied upon employment of high intensity microwave puffing which has not proven to be commercially practical.

Also known are biscuits comprising exterior layers fabricated from cooked cereals or cook cereal doughs and optionally containing a filling of fruit or a confectionery composition.

The present invention provides a novel approach to the formation of laminated multilayered cereal pieces of surprisingly appealing pastry-like texture. The present invention resides importantly in forming a multiplicity of unusually thin layers combined to form a bed or mass which upon controlled compression to include interstitial voids, which when formed into pieces and dried or toasted, create this unique texture. The present invention includes a novel and useful process by which such novel R-T-E cereal pieces can be realized.

SUMMARY OF THE INVENTION

Disclosed are multi-layered, cereal pieces. The cereal pieces comprise at least four and up to about 20 discrete layers each 100–500 micrometers ("μm") thick and each fabricated from cooked cereal dough. The cereal pieces have a bulk density ranging from about 0.06 to 0.4 g/cc, and each weigh about 0.2–10 g. The cereal pieces are essentially characterized by a laminate structure of a multiplicity of intermediate cereal dough flakes or layers each having a finished volume the same as its initial volume. The pieces include interstitial voids intermediate the layers ranging from about 0.1 to 4 mm in thickness and averaging about 0.8 mm. The cereal pieces preferably include a topical coating.

In its method aspect, the present invention resides in comprising the steps of: providing a compressed laminated cereal dough bed or mass having a multiplicity of distinct horizontally extending parallel thin layers each fabricated from a cooked cereal dough; forming individual pieces from the laminated sheet, drying the pieces to 2% to 6% moisture, and optionally applying a topical coating.

While not essential to describing the present invention to one skilled in the art, the photographic view included herein are presented in conjunction with specific examples to provide a visualization of what is verbally described in the specification.

DETAILED DESCRIPTION OF THE INVENTION

The present invention provides laminated multi-layered cereal pieces of horizontally aligned thin generally parallel layers with interstitial voids, and their methods of preparation. Each of the product preparation steps are described below in detail.

Throughout the specification and claims, percentages are by weight and temperatures in degrees Centigrade, unless otherwise indicated.

Figure 1:
FIG. 1 is an enlarged photograph showing a side view of a cereal piece of the prior art.
Figure 2:
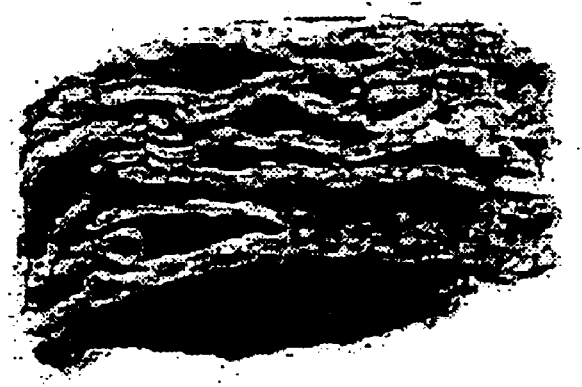
FIG. 2 is an enlarged photograph of a representative cereal piece of the present invention.

Referring now briefly to the photograph that is FIG. 2, it can be seen that generally, the present cereal pieces are fabricated from and comprise a multiplicity of thin generally parallel layers ranging from four to 20 layers and preferably about 5 to 15 cereal layers and for best results about 8–12 layers. In contrast, it can be seen in FIG. 1, a prior art product, that flakes are aligned in random order with as many in one direction as another. In FIG. 2, it is seen that while certain layers of the present cereal pieces have an undulating or scalloped appearance, the layers are generally parallel and are distinguished from the small flakes of random orientation of the product shown in FIG. 1. In the present products, each cereal layer can range in thickness from 100–500 micrometers ("$\mu$m"), more preferably 200–400 micrometers. Each cereal layer is fabricated from a cooked cereal dough. The layers can be fabricated from the same cooked cereal dough formulation, or one or more layers can be fabricated from different cooked cereal dough formulations. For example, one layer can be fabricated from a whole wheat cooked cereal dough while other layers can be fabricated from a rice based cooked cereal dough while still another layer(s) can be fabricated from a corn based cooked cereal dough. In still other variations, a particular layer can be fabricated from a quantity of flakes. To obtain the desired laminate appearance and pastry like texture, importantly, the flakes are not only characterized by a thickness feature but also by a major surface area averaging at least 2 cm$^2$. In contrast, prior products are characterized by smaller flakes having smaller average individual surface areas on the order of 0.1 to 0.8 cm$^2$. The flakes can be fabricated from cooked cereal doughs of identical or different formulation. Preferably, when layers are fabricated from ribbons or flakes, the number of individual ribbons or flakes comprising a single layer will not exceed three. In preferred variations, the layers or at least a majority of the cereal layers are imperforate, i.e., are to be distinguished from layers fabricated from shreds or mesh or dough sheets having grid configurations of holes or perforations.

FIG. 2 further shows that the cereal pieces exhibit a multiplicity of interstitial void spaces or channels between layers. These interstitial voids can range from about 0.1 to 4 millimeters and in the preferred embodiment average about 0.8 millimeters.

The cereal pieces are dried to shelf stable moisture contents. Good results are obtained when the moisture content is 6% or less with better results with moisture contents ranging from about 2% to 4%.

The cereal pieces exhibit appealing and unique pastry-like eating quality due importantly to the combination of a multiplicity of thin layers and voids.

The topical surface of the cereal pieces can optionally include additional appearance features such as corrugations or ripples to enhance visual appeal or eating quality.

The cereal pieces can additionally comprise various particulates intermixed with the layers as further described below. In still other variations, the cereal pieces can include one or more low moisture layers of non-cereal material such as granular sugar, freeze-dried fruit, a dried fruit puree, a chocolate layer, a creme filling layer (e.g., a mixture of fat and sugar), a peanut butter layer and mixtures thereof.

Also if desired, the pieces can include a topical coating such as a sugar syrup coating, a fat or oil coating, e.g., a confectionery fat or chocolate coating, a powdered sugar coating, e.g., flavored with ground cinnamon, or non-nutritive sweetener blend.

Figure 3:
FIG. 3 depicts a quantity of cereal pieces of the present invention disposed in a cereal bowl useful as a R-T-E cereal product.

As seen in FIG. 3 which shows a quantity of bite-sized pieces in a cereal bowl, for R-T-E cereal products, the products can be fabricated into bite sized pieces of convenient size and shape. Good results are obtained when a quantity of pieces has piece count of about 6 to 20 per 10 g. Preferred for use herein are pieces further characterized by low aspect ratios, e.g. less than 3:1 of longest to shortest dimension, especially those of regular shapes, e.g., cubes, disks or cylinders, parallelograms or biscuits although other more complex shapes are contemplated. Of coarse, smaller or larger sized pieces (such as for grain based snacks) can be practiced. Uncoated pieces having the good piece count range are characterized by a bulk density of about 0.06 to 0.4 g/cc, preferably about 0.1 to 0.25 g/cc.

The first essential step of the present cereal product preparation process is to provide a compressed laminated cereal dough bed or mass having a multiplicity of distinct horizontally extending parallel thin layers each fabricated from a cooked cereal dough. The art is replete with teachings and methods for preparing cooked cereal dough compositions and forming such compositions into sheets or flakes. The skilled artisan will have no difficulty in providing such cooked doughs as a starting material.

Generally, however, in the conventional preparation of cooked cereal doughs, the essential cereal ingredients and other ingredients such as cereal fines and/or regrinds are combined with water and heat and mild pressure to cook or gelatinize the starchy component of the cereal ingredients. Thereafter, the cooked cereal is combined with the other ingredients and mixed with low or high shearing to form the cooked farinaceous dough.

A variety of well-known cooking methods and equipment can be used to prepare cooked cereal doughs. For example, the cereal blend can be processed in a cooker extruder or in a pressurized and agitated steam cooker each of which form a cooked cereal dough. In another variation, the cooking and dough forming steps are performed simultaneously in a conventional high pressure, high shear cooker extruder (e.g., single screw or twin screw extruder). In still other variations, the cereal materials can be partially cooked or conditioned in one vessel (e.g., a steam conditioner) and then finish cooked in second vessel (e.g., a single screw extruder).

In the preparation of whole grain based cooked cereal doughs, the whole grains typically require or benefit from extended cooking times. Traditional, low pressure, low shear, extended cook time batch or semi-continuous cookers can be used. The whole grains (whether as intact grains or cut into various sized particles) such as whole wheat are added to water, salt and optionally malt and/or sugar(s) and cooked for extended times to form a cooked whole grain cereal having a desirable cooked flavor. In another variation, the whole grain, water and minor ingredients can be formed quickly into a cooked cereal dough using a cooker extruder. Since cook times in a cooker extruder are so short, in one minor variation, the grains are partially cooked in a conditioner with steam (atmospheric or slightly pressurized) prior to being fed to the extruder. Such a preconditioning or partial cooking allows the grain to develop a better cooked flavor.

The term "refined cereal doughs" is used herein in contrast to whole grain cereal doughs. "Refined" cereal doughs as used herein refers to those cooked cereal dough compositions that do not contain whole grain ingredients (i.e., contain less than about 2% whole grain cereal flour ingredients) but comprise conventional white cereal flours. More particularly, refined cereal doughs are essentially characterized herein by a low level of a fiber content (typically supplied by the whole grain ingredient and/or germ ingredient). Refined cereal doughs desirably contain herein less than about 5% total dietary fiber and less than 2% cereal germ ingredient. Additionally, refined cereal doughs can comprise "highly refined" cereal doughs. By "highly refined" herein it is meant cereal doughs comprising either pure cereal starch fractions and/or sucrose. Adding pure cereal starches and sucrose each have a beneficial effect on the dough compositions ability to expand. Highly refined cereal dough compositions herein comprise about 1% to about 25% of a cereal starch ingredient and/or about 10% to 40% by weight of sucrose.

Of course, the cooked cereal doughs can comprise major grain cereals including those of wheat, corn (maize), oats, rice, barley and mixtures thereof. While these major grains are most popular, minor useful grains include amaranth, millet, sorghum, triticale, flax and mixtures thereof. Within this general outline of cereal processing for the provision of cooked cereal doughs, a wide variety of particular methods and composition variations can be used. Also, the dough layers can optionally include a variety of ingredients to improve the appearance, taste and nutritive properties including flavors, such as vitamin/mineral fortification, etc.

The present invention is suitable for use in connection with the preparation of whole grain R-T-E cereal products from whole grain based cooked cereal doughs. Even more particularly, the present invention is suitable for use in connection with wheat based flaked R-T-E cereal having the following essential ingredients:

| Ingredient | Weight % |
| --- | --- |
| Grain (wheat, rice) | >70 |
| Carbohydrate (sugar, maltodextrin, dextrose) | 20–25 |
| Flavor agents (salt, soybean oil) | 4–6 |
| Processing aids (monoglycerides, tricalcium/trisodium phosphate) | 1–2 |
| Vitamin/mineral blend | 0.05–0.5 |

Desirably, the cooked cereal dough has a moisture content of about 18% to 35% prior to formation of the laminated sheet, preferably 18% to 26%, and more preferably about 18% to 20%.

The cooked cereal dough is then formed into thin continuous sheets/ribbons or into a multiplicity of individual flakes to form the layers.

In a first thin continuous ribbons variation, the dough is formed into sheets by conventional means such as by feeding at least one dough rope into one or more sheeting rolls to form the present cooked cereal dough sheets of the requisite thickness of about 0.008–0.015 inch (200 to 400 micrometers or "$\mu m$"). Separately, the thin continuous sheets can be longitudinally subdivided into continuous ribbons. The sheet temperature following formation can range from about 25 to 44° C. (80–110° F.). The thin continuous sheets or ribbons are folded back and forth on itself to form the number of layers desired. The sheets can be fabricated from all the same formulation of cooked cereal dough or each can be of a particular cooked cereal dough formulation. For example, one or more layers can be fabricated from a whole wheat cooked cereal dough while one or more layers can be provided by a cooked cereal dough having other desirable properties, e.g., a second whole grain such as whole grain corn. In still other variations, one or more layers can be fabricated from a cooked cereal dough formulated to be more tender or of a lighter texture to provide lighter texture properties to the finished cereal products. In still other variations, one or more sheet layers can be fabricated from a highly flavored cooked cereal dough, e.g., cinnamon, or chocolate while other layers, provide, for example, high fiber levels.

In a second preferred variation, the cereal dough is first formed into pellets and the pellets then formed into individual wet thin flakes. In this variation, the cooked cereal dough is sheeted to greater thickness, e.g., 1500 to 2500 micrometers (about 0.060 to 0.10 in.), and then cut first into ribbons and then the ribbon are cross cut to form individual pieces or "pellets", e.g., square or rectilinear. These relatively thicker individual pieces or pellets are preheated to a temperature as hot as possible without pre-puffing (in this application 55–65° C.) and fed to conventional flaking rolls to form thin warm wet individual flakes ranging in thickness from about 200–400 micrometers (0.008 to about 0.015 in.). The skilled artisan will appreciate that such wet flakes are substantially thinner than wet flakes conventionally used to make flake R-T-E cereals that are typically characterized by a thickness ranging from about 0.20 to about 0.35 inch. The flakes are allowed to fall on top of each other forming the number of desired layers. Using flakes is preferred to a multiplicity of continuous sheets or ribbons of cooked cereal dough. Due to the thinness of the present layers, continuous ribbons are subject to frequent tearing in commercial manufacturing. Depending on the end product desired, the quantities of flakes of one cooked dough composition can be varied. For example, all the flakes can be of one cooked cereal dough formulation.

It should be appreciated that preferably both the thin flakes (individual pieces) and/or the thin continuous ribbons are each substantially imperforate, i.e., are to be distinguished from the nets or woven shreds of cooked cereal dough characteristic of shredded wheat biscuits.

While still moist and warm, the thin ribbons, and/or thin flakes are formed into a bed or mass of thin horizontally oriented parallel layers characterized as being visually distinct with interstitial voids. The total number of layers can range from at least four to about 20. Once the layers are formed, it is important that at least a portion of the layers be bound together to prevent total delaminating upon further processing and complete separation of the layers from each other. In certain embodiments, only end regions or middle regions of the layers are bound together. This partial bonding is accomplished by applying a compressive force on the layered warm and wet cereal dough. Optimal bonding dough conditions have been found to be at a bed temperature ranging from 25 to 44° C. (80–110° F.) arid bed moisture ranging from 16–20% moisture. The warmer and wetter the dough, the less visibly distinct the layers can become, however the cooler and dryer the dough, the less partial bonding occurs. Good results are obtained with sufficient compression to reduce the bed thickness from 100% to a compressed thickness ranging from about 35 to 65% of its original or uncompressed thickness. The bed thickness generally ranges from about 15–50 mm, preferably about 25–35 mm in thickness before compression, and 10–20 mm in thickness after compression, preferably about 10–15 mm. The compressing step can be practiced using conventional sheeting apparatus, generally one or more pairs of counter-rotating compression rollers or belts. Good results are obtained using pressures ranging from about 10 to 50 psi (6 to 300 kPa), preferably about 25 psi. Increased compression reduces the amount and degree of voids and channels.

Unlike the fabrication of granola bars, the mass of cereal flakes is generally not admixed with a binder material such as a sugar syrup. If desired, layer bonding can be increased by employing various additives. For example, the products can optionally comprise on or more layers of a sticky fruit paste layer.

Also, the layers can be intermixed with a wide variety of extra small particles or particulates. Such particulates can comprise any solid particulate material to provide the finished R-T-E cereal pieces with desired visual, nutritional and/or organoleptic attributes. For example, the extra particles can comprise candies, dried fruit bits, nut pieces (e.g., almonds, coconut, hazel, peanut, and mixtures thereof), seeds (e.g., flax, poppy, sesame), dried marshmallow pieces or flakes, texturized vegetable protein, ground sugar, or non-nutritive sweetner blends can be intermixed with the wet flakes or continuous ribbons. Good results are obtained when the extra particles comprise about 1% to about 30%, preferably about 5% to 15% of the finished product. While the particle size of the extra particles is not critical, good results are obtained when the extra particles range from about 0.1 to 3 mm.

Optionally, the laminated sheets or ribbons can be fabricated with additional non-cereal intermediate layers and/or materials. For example, the laminated sheets can be fabricated with an intermediate sweetened fruit puree layer. An exemplary suitable fruit composition has the following formulation:

| Ingredient | Weight % (dry weight) |
| --- | --- |
| Fruit puree solids | 10%–60% |
| Carbohydrate sweeteners | 0%–50% |
| Glycerin | 10%–20% |
| Moisture | 2%–10% |

Since the moisture is removed subsequently, the moisture content of the fruit layer is selected for convenience.

The intermediate fruit layer(s) can be applied over the intermediate cereal dough layer prior to formation of the laminated sheet or continuous ribbon. The fruit layer can range in thickness from about 2,000 to 4,000 $\mu$m (0.080 to 0.160 inch).

In other variations, a fat-based layer of like thickness can be employed, e.g., a frosting, or a "summer" confectioner's composition, or a peanut or other nut butter spread.

Next, the compressed bed of cereal dough sheets/ribbons or flakes can be formed into individual pieces of desired shape and size. Conventional cutting, stamping, or molding techniques and equipment can be used to practice this step. Generally, larger pieces are prepared for snack applications compared with the generally smaller pieces used for R-T-E cereals. In preferred variations, the sheets are cut into nested or tesserated shapes such as triangles, squares, rectangles or parallelogram shaped so as to minimize regrinds. The individual pieces can range in size from about 0.1 to about 10 g each when finish dried, preferably about 0.5 to 5 g.

In still other variations, the compression and piece forming steps can be practiced simultaneously such as when crimping rolls both compress and form individual pieces. In still other variations, the crimping rolls can be machined with surfaces designed to impart surface feature or texture to the pieces such as ribbing or ripples to enhance their appeal.

In the next essential step, the laminated pieces so formed into individual pieces are dried/toasted to a finished product moisture of 2% to 6%, preferably about 2% to 4%. In one variation, the individual wet pieces of moisture 16–18% can be dried to an intermediate moisture of 9–11% via a conventional belt multi-pass dryer, with a subsequent belt toaster or air impingement dryer completing the drying and toasted to a finished moisture of 2–6%, preferably about 2–4%. In another variation, the individual wet pieces of moisture 16–18% can be directly dried and toasted to the final moisture of 2–6%, preferably about 2–4% via a band oven. In preferred variations, the drying step is practiced quiescently, i.e., with minimal agitation, to minimize product breakage and delamination.

The resultant laminated dried and toasted products are generally characterized by a cumulative layer thickness of about the same as the wet compressed bed of layered cereal dough sheets, ribbons, or flakes 10 mm to 20 mm. For better results in terms of hardness of the final product, the pieces have cumulative thicknesses ranging from about 10 to 15 mm.

The present methods can optionally comprise a scalping step to remove cereal fines and broken pieces. The scalped material or recoup material can be recycled and added to the dry cereal materials used to prepare the cooked cereal doughs.

The present methods can further optionally comprise the step of applying a topical coating to the laminated dried cereal pieces.

Conveniently, this step can comprise a first sub-step of applying a first base or tacky coating and then applying a second top or non-tacky or finish coating. Conveniently, the base or tacky coating can be a liquid such as an oil or sugar syrup or oil/syrup binder or slurry while the finish coating can be a particulate material. The ratio of cereal pieces to topically coating can range from about 1–20:1, preferably about 1–5:1 and for best results about 4:1.

For example, the dried laminated pieces can be sprayed with about 5–10% oil or a liquid binder to form tacky or oil coated dried laminated cereal pieces. Thereafter, the tacky or oil coated dried laminated cereal pieces can be dusted with a powder coating such as a blend of powdered sugar and cinnamon (e.g. in a 10:1–3 ratio of sugar to cinnamon). In still other variations, the second dry coating can include any of the particulate materials whether the same or different from any particulates added intermediate to the cereal layers. In variations intended for snack products, the second top coating can comprise a seasoning blend and/or dried cheese powder.

In certain other preferred variations, the pieces additionally include a conventional presweetening topical coating. Well known compositions and presweetener coating application techniques can be employed both for sugar coating or when various high potency sweeteners, e.g., aspartame, sucralose, or potassium acetylsulfame are used. In more preferred embodiments, the presweetening coating comprises sugar and/or corn syrup, a flavor constituent, oil and/or vitamins. The addition of a flavor constituent to the sugur coating solution is preferred due to flavor losses that can occur from the frying or toasting steps practiced herein. These steps, due to their heat application, tend to drive off the volatile flavor constituents leading to flavor degradation or loss.

The finished, laminated R-T-E cereal products include both 1) regular and 2) presweetened and/or coated products prepared therefrom.

The multi-layered cereals products prepared as described can be packaged and distributed in conventional manner.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the R-T-E cereal art, can be undertaken without departing from the spirit and scope of the invention.

EXAMPLE 1

A laminated multi-layered R-T-E cereal of the present invention is prepared according to the following process.

Three individual batches of cooked cereal dough were prepared. Separate formulas are used, containing the following ingredients and percents by weight (dry basis).

| Ingredient | Weight % |
|---|---|
| Formula No. 1 White Rice Formula | |
| White rice flour | 70.0 |
| Brown rice flour | 13.0 |
| Sugar | 7.7 |
| Soybean oil | 3.0 |
| Salt | 1.0 |
| Wheat starch | 5.2 |
| Trisodium phosphate | 0.1 |
| | 100.0% |
| Formula 2 Yellow Corn | |
| Yellow corn cones | 72.0 |
| Oat flour | 5.5 |
| Wheat flour | 10.0 |
| Sugar | 8.0 |
| Soybean oil | 2.0 |
| Salt | 2.5 |
| | 100.0% |
| Formula 3 Brown Wheat | |
| Cut wheat | 40.0 |
| Rice flour | 33.0 |
| Sugar | 15.0 |
| Soybean oil | 3.5 |
| Dextrose | 4.3 |
| Salt | 2.5 |
| Non-fat dry milk | 1.7 |
| | 100.0% |

Individual batches of the above formula were prepared.

The doughs were separately cooked in conventional manner using a single screw cooker extruder with preconditioning. The doughs were cooked to a moisture of approximately 18% to 20% and a temperature of 270–290° F. (132–143° C.).

The warm, cooked, colored doughs were then formed into sheets using a conventional sheeter/forming roll with one corrugated face to form three individual sheets each having one major face having corrugations. The moisture was 18% to 20% and the temperature was approximately 100° F. (38° C.).

Thereafter, multiple dough sheets of all three formulas were stacked horizontally with each corrugated face positioned downwardly. The layered sheets so stacked and arranged were then fed to a set of compression rolls to form a laminated sheet.

This multiple layered sheet was then cut into various shapes and sizes using a conventional rotary cutting unit. The shapes included squares, hexagons, triangles and parallelograms.

The shaped pieces were then dried from 18% to 20% moisture down to approximately 10% moisture. The drying unit was a conventional forced air convection dryer. The pieces were dried at 82° C. (180° F.) for 30 minutes.

The dried pieces were then finish dried and toasted in a band oven at 200° C. for about 10 minutes. The product density was 0.22 grams per cubic centimeter. The final moisture was approximately 2% to 3%.

The cereals products so prepared were characterized by having a plurality of layers that were visibly discrete.

EXAMPLE 2

A variation of the above is to produce a multiple layer piece in which a fruit layer is substituted for one of the intermediate cereal dough layers.

The cooking, sheet forming, cutting, drying and toasting methods are all similar to Example 1.

The fruit layer had the following composition:

| Ingredient | Weight % |
|---|---|
| Strawberry solids | 28 |
| Carbohydrate sweeteners | 55 |
| Stabilizer | 4 |
| Glycerin | 12 |
| Others | 1 |
| | 100.00% |

Finished R-T-E cereals of equivalent properties are prepared when the strawberry ingredient is replaced with equivalent amounts of cherry, blueberry, grape, raspberry, apricot, pear, raisin, date, fig and mixtures thereof.

EXAMPLE 3

Another variation employing a process similar to that of Example 1 is to produce a, multi-layered R-T-E cereal that is topically coated with sugar/flavor. The topical coating can be applied by an aqueous sugar/flavor slurry which is subsequently dried, or a dry blend of sugar/flavor can be adhered to the cereal by a sticky ingredient such as soybean oil, starch, or sugars.

An aqueous sugar/flavor slurry is as follows:

| Ingredient | Weight % |
|---|---|
| Sucrose | 67 |
| Corn Syrup | 12 |
| Flavor | 1 |
| Water | 20 |
| | 100% |

The slurry is applied in a conventional manner by spraying the sugar based slurry, with or without flavor additive, onto the dried/toasted cereal pieces. The coated pieces are then dried down to approximately 2% moisture in a conventional forced air dryer.

A dry sugar/cinnamon blend adhered by soybean oil is as follows:

| Ingredient | Weight % |
|---|---|
| Sucrose | 97 |
| Cinnamon | 3 |
| | 100% |

The sucrose granulation is more finely ground than table sugar (30% max through a #120 US standard sieve). Soybean oil is sprayed on the dried/toasted cereal pieces in a ratio 1:9 and the dry sugar/cinnamon blend is sprinkled onto the oil coated cereal pieces in a ratio of 1:3.

What is claimed is:

1. A plurality of multi-layered non-puffed laminated cereal pieces, each piece comprising:
   A. from 4 to 20 non-puffed cereal layers wherein each layer:
      1) being fabricated from a cooked cereal dough,
      2) having a thickness of about 100 to 500 micrometers,
   wherein a quantity of said pieces having:
      a piece count ranging from about 6 to 20 per 10 g
      a bulk density of about 0.06 to 0.4 g/cc., and
      a moisture content of <6%,
   wherein one cereal layer forms a first major exterior face and a second cereal layer forms an opposing second major exterior face, with each of the one and second cereal layers being fabricated from a continuous sheet layer while multiple intermediate layers are each fabricated from at least two flakes wherein at least a portion of at least one intermediate dough layer is delaminatable from an adjacent layer.

2. A plurality of multi-layered non-puffed laminated cereal pieces, each piece comprising:
   A. from 4 to 20 non-puffed cereal layers wherein each layer:
      1) being fabricated from a cooked cereal dough,
      2) having a thickness of about 100 to 500 micrometers,
   wherein a quantity of said pieces having:
      a piece count ranging from about 6 to 20 per 10 g
      a bulk density of about 0.06 to 0.4 g/cc., and a moisture content of <6%, wherein at least one layer is fabricated from a continuous sheet and at least one layer is fabricated from at least two flakes.

3. The multi-layered cereal piece of claim 2 wherein one cereal layer forms a first major exterior face and a second cereal layer forms an opposed second major exterior face.

4. The multi-layered cereal piece of claim 1 further including a topical coating.

5. The multi-layered cereal piece of claim 4 further including a fruit paste layer intermediate at least two dough layers.

6. The multi-layered cereal piece of claim 2 wherein the piece further includes at least one layer of a non-cereal material intermediate at least two cereal dough layers.

7. The multi-layered cereal piece of claim 2 wherein at least one layer comprises a whole grain based cooked cereal dough.

8. A method for preparing non-puffed multi-layered cereal pieces comprising the steps of:
   A. providing a compressed laminated cereal dough bed or mass having a multiplicity of distinct horizontally extending parallel thin layers each fabricated from a cooked cereal dough,
   wherein the cereal dough bed or mass has
      a cumulative thickness of the layers ranges from about 10 mm to 25 mm;
      a temperature of about 20° C. to about 45° C., and,
      a moisture content of about 15–20%;
   B. forming the compressed cereal dough bed or mass into pieces;
   C. drying the pieces to a moisture content of about less than 6% to form dried laminated cereal pieces.

9. The method of claim 8 wherein in Step A each layer ranges in thickness from about 100–500 micrometers.

10. The method of claim 9 wherein the compressed bed has a cumulative bed thickness of 10–15 mm.

11. The method of claim 10 wherein at least one cereal dough layer is of a different color or composition.

12. The method of claim 11 wherein at least one layer comprises a whole grain based cooked cereal dough.

13. The method of claim 12 wherein in Step B the pieces each range from about 0.5–5 g.

14. The method of claim 13 wherein the bed is free of a sugar syrup binder.

15. The method of claim 14 further comprising the step of:
   D. providing the cereal pieces with a topical coating.

16. The method of claim 8 wherein Step A comprises the sub-steps of:
   A1. providing a multiplicity of at least five layers of separate thin sheets of semi-moist cooked cereal doughs, or layers of individual flakes having an initial thickness, and
   A2. compressively layering the separate sheets or flake layers to form a single continuous compressed mass having a compressed thickness whereby the layers are bonded together.

17. The method of claim 12 wherein in Step A the sheet further includes at least one layer of a non-cereal material intermediate at least two cereal dough layers.

18. The method of claim 17 wherein in Step A all layers are provided by a quantity of thin flakes.

19. The method of claim 18 wherein at least one dough sheet or layer of flakes is fabricated from a whole grain cooked cereal dough selected from the group consisting of wheat, rice, corn, oats and barley.

20. The method of claim 19 wherein at least one cooked cereal dough layer or layer of flakes comprises a whole wheat based cooked cereal dough.

21. The method of claim 15 comprises the sub-steps of:
   D1. applying a first liquid or binder base coating to the cereal pieces to form a base coated laminated cereal pieces, and,
   D2. applying a particulate top coating to the base coated laminated cereal pieces to form a topically coated laminated cereal piece.

22. The method of claim 21 wherein the weight ratio of laminated cereal pieces to topical coating ranges from about 1–20:1.

23. The method of claim 22 wherein in Step D2, at least a portion of the particulate top coating is supplied by ground sucrose.

24. The method of claim 23 wherein Step D2 at least a portion of the particulate top coating is supplied by ground cinnamon.

25. The method of claim 15 wherein step D includes:
   providing the cereal pieces with a pre-sweetening coating.

26. The method of claim 25 wherein step D comprises:
   coating the cereal pieces with a sugar syrup or slurry coating solution to form coated cereal pieces, drying the coated cereal pieces to a moisture content of less than 6%.

27. The method of claim 11 wherein Step A comprises the sub-steps of:
   A1. providing at least four workable cooked dough sheets to form aligned a top, a bottom and two intermediate layers, and
   A2. forming the dough sheets into a single laminated sheet having at least four distinct plies adhered to at least a portion of each other.

28. The method of claim 17 wherein in Step A the dough bed or mass further includes particulates of a non-cereal material intermediate at least two cereal dough layers.

29. The method of claim 28 wherein the non-cereal particulate material includes a blend of powdered sugar and cinnamon.

30. The method of claim 8 wherein at least one layer comprises a whole wheat based cooked cereal dough.

31. The method of claim 8 wherein at least one layer comprises a corn based cooked cereal dough.

32. The method at claim 16 wherein in step A2 the compressed thickness ranges from about from about 35 to 65% of the initial thickness.

33. The method of claim 32 wherein the compressed thickness ranges from about 10–25 mm.

34. The method of claim 33 wherein in Step A2 is practiced at compression pressures ranging from about 6 to 300 kPa.

35. The method of claim 34 wherein the compressed bed comprises about 8–12 layers of cereal dough layers.

36. The method of claim 35 further including adding a fruit paste layer intermediate at least two dough layers.

37. A multi-layered cereal piece prepared according to the method of claim 8.

38. A multi-layered cereal piece prepared according to the method of claim 9.

39. A multi-layered cereal piece prepared according to the method of claim 10.

40. A multi-layered cereal piece prepared according to the method of claim 11.

41. A multi-layered cereal piece prepared according to the method of claim 12.

42. A multi-layered cereal piece prepared according to the method of claim 17.

43. A multi-layered cereal piece prepared according to the method of claim 22.

44. A multi-layered cereal piece prepared according to the method of claim 27.

45. A multi-layered cereal piece prepared according to the method of claim 32.

46. A multi-layered cereal piece prepared according to the method of claim 36.

47. The method of claim 8 wherein the steps A–C are practiced in sequential order.

\* \* \* \* \*